Figure 1:
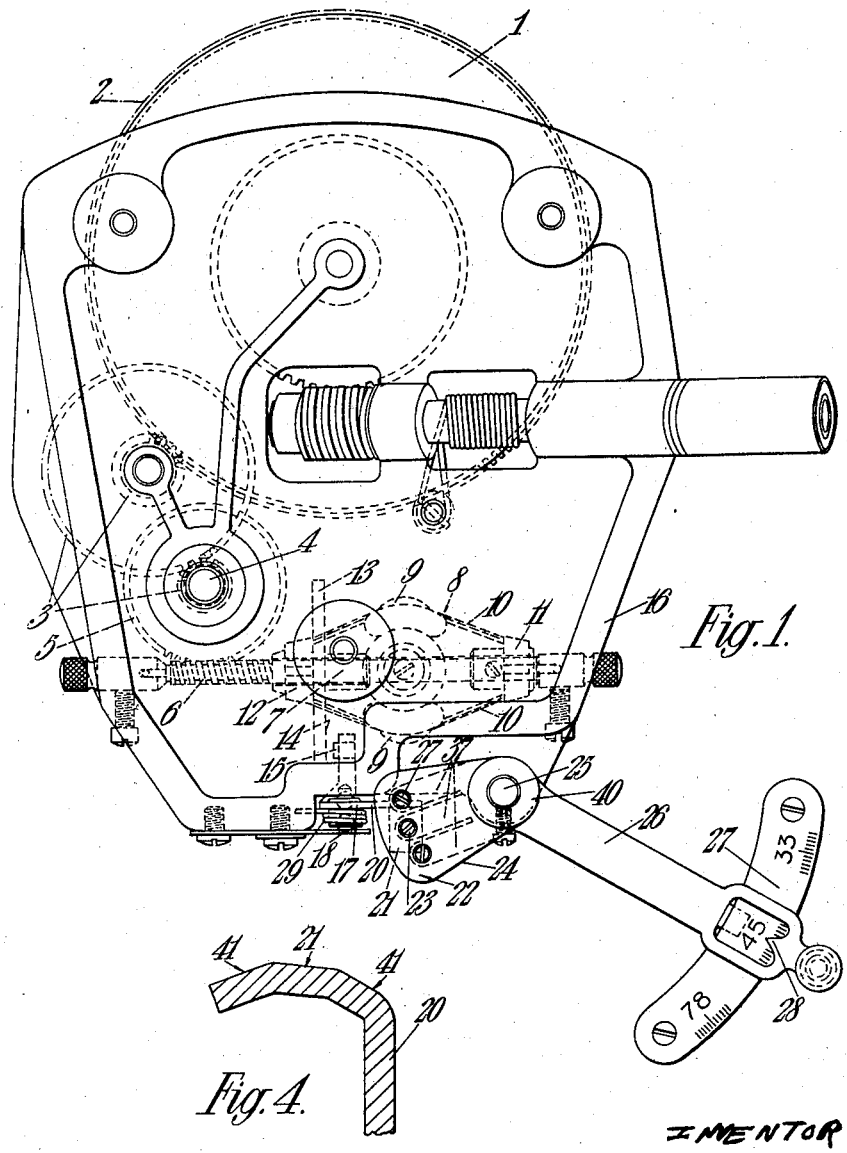

May 26, 1959  W. BUTLER  2,888,108
SPEED CONTROL FOR GRAMOPHONES AND THE LIKE
Filed July 13, 1955  2 Sheets-Sheet 2

INVENTOR
Wilfred Butler
by David M ...
his atty

United States Patent Office 2,888,108
Patented May 26, 1959

2,888,108

SPEED CONTROL FOR GRAMOPHONES AND THE LIKE

Wilfred Butler, Swindon, England, assignor to The Garrard Engineering and Manufacturing Company Limited, Swindon, England Application July 13, 1955, Serial No. 521,849

Claims priority, application Great Britain July 27, 1954

3 Claims. (Cl. 188—187)

This invention relates to spring-driven motors for gramophones and the like and has for its aim the provision of speed control means for the turntable spindle drive which enables the selection of a plurality of turntable speeds, for example, 78, 45 and 33⅓ revolutions per minute, so that the one motor unit can be used in connection with the various speed types of gramophone record available.

An object of the present invention is to provide speed control mechanism for a spring-driven motor for gramophones and the like in which not only is the aforementioned speed selection available, but there is also provided a range of micro-adjustments for each speed setting so that the speed in use can be accurately obtained, for example with the use of a stroboscopic disc in known manner.

A further object of the present invention is the provision of speed control means for a spring-driven motor for gramophones and the like in which the moving parts comprising the selective speed control mechanism are such as to eliminate backlash as far as practically possible.

A still further object of the present invention is to provide speed control means for a spring-driven motor for gramophones and the like, according to either of the preceding paragraphs, in which the necessary setting or resetting adjustments to the speed control mechanism are effected quickly and easily.

The invention consists in speed control mechanism for a spring-driven motor for gramophones and the like having speed control governor means according to known practice, wherein displacement of the governor restraining means, for example a governor disc, is effected or permitted to a plurality a spaced predetermined positions only so that the speed restraint level of the restraining means can be selected according to one or other of a plurality of predetermined speeds required.

The invention further consists in speed control mechanism for spring driven motors, according to the preceding paragraph, wherein each of the predetermined positions which the governor restraining means assumes is dictated by the position of displaceable abutment means with which the governor restraining means has slipping contact as the governor rotates, means being provided for selecting the displacement given to the said abutment means.

The invention still further consists in speed control mechanism for spring-driven motors according to the preceding paragraph wherein the means for selecting the control position of said abutment means comprises a lever carrying said abutment means and pivoted on the motor chassis, a contact surface on the abutment lever and manually displaceable means for bringing into contact with the contact surface any one of a plurality of speed selector members of differing lengths, the arrangement being such that each speed selector member is responsible for causing the abutment lever to pivot to a different predetermined degree and so effect predetermined displacement of the abutment means, according to the speed setting required.

The invention still further consists in speed control mechanism for spring-driven motors, according to the preceding paragraph, wherein the contact surface on the abutment lever is very slightly inclined to the plane of adjustment path of the manually displaceable selector members, the arrangement being such that movement of any one of the selector members, when in contact with the contact surface, over the contact surface produces a very small displacement of the abutment so as to effect a micro-speed adjustment at any one of the chosen speed settings.

Figure 2:
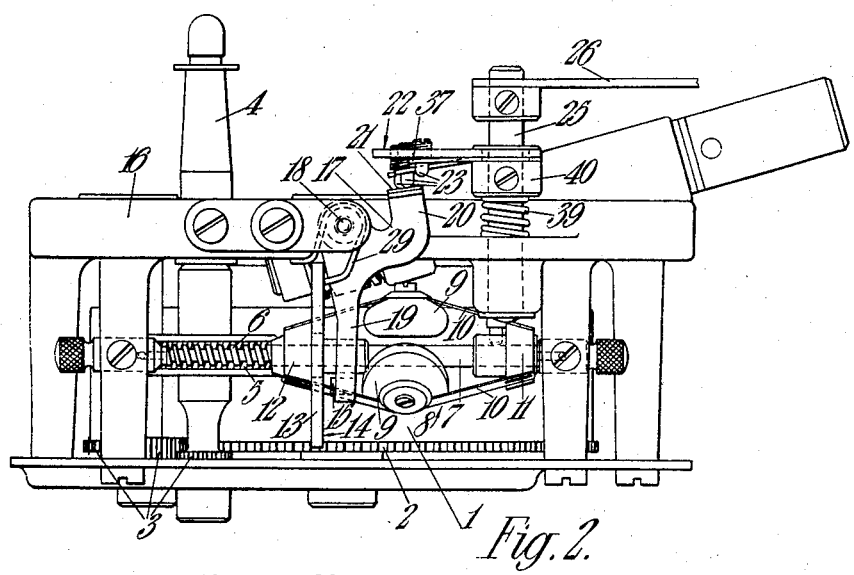

In the accompanying drawings:

Figure 1 is a plan view of a spring-driven gramophone motor having speed control mechanism according to this present invention, Figure 2 is a side elevation of the motor shown in Figure 1, and Figures 3 to 7 are detail views of parts of the speed control mechanism according to the present invention.

In carrying the invention into effect according to one convenient mode by way of example, the speed control mechanism will be described as applied to a spring-driven motor of orthodox construction, briefly described below.

The main motor spring is contained within a casing 1 the periphery of which is formed with spur gearing 2 which meshes with one of a chain 3 of intermediate, step-up, gears connected finally to the turntable spindle 4. The turntable spindle 4 also carries a worm wheel 5 which is in mesh with a worm 6 provided on the motor governor shaft 7. The governor 8 is of known form comprising a plurality of weights 9 each carried on a resilient arm 10 linked at one end to an abutment 11 fixed against both axial and rotary movement with respect to the governor shaft 7, and at the other end with an abutment 12 fixed against rotative movement on the governor shaft 7 but permitted to have free axial sliding movement thereon. As the governor weights 9, are driven round by the governor shaft 7, centrifugal force causes the weights 9 to tend to fly radially outward, so that, due to the flexibility of their mounting arms 10, the slidable abutment 12 is drawn up the governor shaft 7 towards the fixed abutment 11, in known manner. In order to restrain or limit the degree to which the governor weights 9 are permitted to fly outwards, a restraining member in the form of a disc 13 secured to the sliding abutment 12 is provided with a face 14 normal to the axis of the governor shaft 7. As the desired limiting speed of the governor is reached the face 14 of the disc 13 makes contact with an abutment member in the form of a pad 15, which prevents the disc 13, and therefore the sliding abutment 12, from travelling further up the governor shaft 7, whereby speed is stabilized at that level.

The speed control mechanism, according to the present invention, is imposed on the governor restraining means, described above in the form of the governor disc 13. Pivotally mounted on the motor chassis 16 is a lever 17 carrying the aforementioned abutment comprising the governor control pad 15, such that rotation of the lever 17 about its pivot 18 causes displacement of the position of the governor control pad 15. The lever 17 is in the form of a bell crank lever, one arm 19 of which carries the governor control pad 15 and the other arm 20 of which terminates in the contact surface 21 adapted to be engaged by any one of a plurality of speed selector means, indicated at 22, operative to effect predetermined displacement of the governor control pad 15 by pivoting of the governor control pad lever 17. The speed selector means 22 comprises a plurality of speed selector pins 23, one for each main speed setting required, for example three pins 23 in the case of speed settings of 78, 45 and 33⅓ revolutions per minute, which are carried on a selector pin arm 24 secured to a shaft 25 mounted vertically in the motor chassis 16. The vertical speed control shaft 25 also carries a speed control arm 26 by which manual speed selection is obtained, a speed selection scale 27 being associated with pointer 28 or other index means on the speed control arm 26. Manual movements of the speed control arm 26 causes rotary movement of the speed control shaft 25 with consequent rotation of the selector pin arm 24 about the speed control shaft axis. The speed selector pins 23, carried by the selector pin arm 24, are each of a different length, as shown in Figure 2, so that when, by movement of the speed control arm 26 as aforesaid, any one of the speed selector pins 23 can be brought into contact with the contact surface 21 on the governor control pad lever 17 whereby a rotation of the governor control pad lever 17 is effected according to the length of the selector pin 23 engaged, with consequent greater or less displacement of the governor control pad 15. Due to the verticality of the speed control shaft 25 the path of movement of the tips of the selector pins 23 is horizontal, and in order to provide for microspeed adjustment for each speed setting, the contact surface 21, on the governor control pad lever 17 is slightly inclined to the horizontal, as shown in Figure 4, so that as any selected pin 23 is moved across the contact surface 21 very small pivotal displacement of the governor control pad lever 17 is effected with consequent micro-adjustment of the position of the governor control pad 15. In order to maintain the contact surface 21 in contact with the speed selector pins 23, at all times and to eliminate play, the governor control pad lever 17 is biased by a spring 29 so that the control surface 21 is urged upwardly against the speed selector pin 23 engaged. In the case of the three speed selection mentioned above, the longest selector pin 23 will cause the governor control pad lever 17 to be rotated to the greatest degree against the spring bias, corresponding to the lowest speed of 33⅓ revolutions per minute, and the shortest pin 23 will permit the governor control pad lever 17 to rotate back under its spring bias, corresponding to a highest speed of 78 revolutions per minute, the central pin 23 providing an intermediate speed of 45 revolutions per minute.

Figure 5:
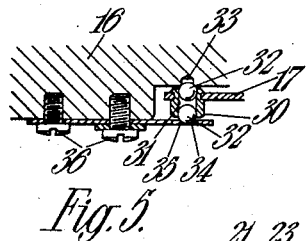
Figure 7:
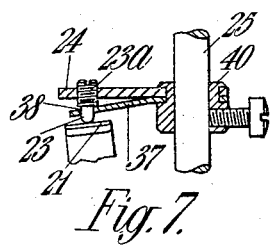
Figure 3:
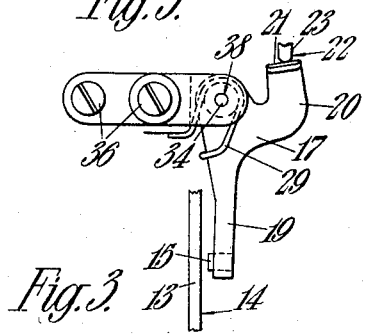
Figure 6:
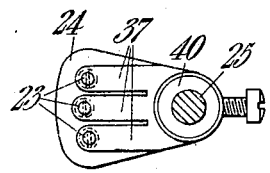

For the accurate reproduction of recorded sounds it is necessary for the speed control to be critical and it is therefore necessary to provide a mechanism in which play, backlash and wear are reduced to a minimum practically possible. To this end the pivotal mounting 18 of the governor control pad lever 17 on the motor chassis 16 is achieved, according to one convenient construction, as shown in Figure 5, by providing on the governor control pad lever 17 a pivot bush into the bore 31 of which a steel ball 32 is pressed at each end so that a hemisphere of each ball 32 projects from each end of the bush 30. One ball 32 engages in a bore 33 formed in the motor chassis 16 and the other ball 32 engages in an aperture 34 formed in a spring bearing plate 35 secured to the chassis 16 by bolts or the like 36, the arrangement being such that the spring bearing plate 35 presses the two spherical bearing surfaces of the balls 32 into their respective bearing apertures 33 and 34.

According to a convenient form, the speed selector pins 23 are held in the selector pin arm 24 by threading 23a so that their effective lengths as regards speed selection may be simply and accurately adjusted by screwing. In the case of the speed selector pins 23 it is also essential to avoid play and backlash and furthermore it is necessary to prevent them from unscrewing when once adjusted, and to this end the pins 23 pass through individual leaf spring members 37, see particularly Figures 6 and 7 which react against a shoulder 38 formed on each selector pin 23 to press the pin against its engagement in the selector pin arm 24 the frictional engagement of the threading 23a so obtained prevents the pins 23 from unscrewing due to vibration or other causes and also eliminates any backlash in the threading 23a.

It is further necessary to provide, according to known practice, anti-backlash means on the speed control shaft 25 and to this end a biasing spring 39 is inserted between the motor chassis 16 and the boss or bush 40 by which the selector pin arm 24 is secured to the speed control shaft 25 so that backlash and play on this shaft is also eliminated.

In order to ensure that the selector pins 23 ride on to the contact surface 21 on the governor control pad lever 17 easily and with a minimum of wear-producing impact, the contact surface 21 is extended in each direction of movement of the selector pins 23 in the form of sloping ramps 41 (see Figure 4), at an angle to the contact surface 21, such that a moving pin 23 first engages a ramp 41 which leads it smoothly up onto the control contact surface 21.

I claim:

1. In combination with a spring operated motor, for phonographs or the like, having a centrifugal speed governor including a rotatable governor disk displaceable axially of its axis of revolution in accordance with the motor speed, speed control mechanism comprising a lever pivoted intermediate its ends and having a pair of arms, one arm disposed in the path of movement of said disk; a pad on the end of said one arm engageable with said disk; a contact surface extending from the end of the other arm transversely to the plane of movement of said lever; a speed selector member movable in a plane perpendicular to the plane of movement of said lever and spaced outwardly of said contact surface; a plurality of pins projecting from said member toward said contact surface for selective engagement with the latter, said pins being arranged in a row extending along the line of movement of the pins, and said pins being of different lengths whereby the position of said pad along the path of movement of said disk is controlled in accordance with the length of the pin selectively engaged with said contact surface by movement of said member; said lever being oscillated by movement of said pins along said contact surface and spring means engaged with said lever and biasing said contact surface toward said pins to maintain said contact surface continuously engaged with a pin to continuously maintain said pad in a positively set position relative to said disk, said contact surface being inclined along the line of movement of the pins and of said member so that adjustment of the point of contact of a pin along said surface will effect a minute variation in the motor speed.

2. Speed control mechanism as claimed in claim 1 including sloping ramp sections extending from each end of said contact surface.

3. Speed control mechanism as claimed in claim 1 in which said member is secured to an oscillatable shaft and comprises a plate extending radially from said shaft, and said pins are arranged along an arc concentric with said shaft and each comprise a portion threaded through an aperture in said plate and having a reduced end to contact said surface; and a spring secured to said shaft in juxtaposition to said plate and having a plurality of apertured fingers each engaging one of said reduced extensions to eliminate backlash of said pins; said plate and spring being secured in a collar adjustably fixed to said shaft.

References Cited in the file of this patent

UNITED STATES PATENTS

| | | |
|---|---|---|
| 623,133 | Cheney | Apr. 18, 1899 |
| 755,852 | Dennison | Mar. 29, 1904 |
| 1,352,419 | Herschede et al. | Sept. 7, 1920 |
| 1,792,426 | Jabas | Feb. 10, 1931 |
| 2,343,219 | Marholz | Feb. 29, 1944 |
| 2,484,331 | Bels | Oct. 11, 1949 |
| 2,534,430 | Fairbanks et al. | Dec. 19, 1950 |